United States Patent
Kiefer et al.

(10) Patent No.: US 8,229,937 B2
(45) Date of Patent: Jul. 24, 2012

(54) AUTOMATIC CREATION AND TRANSMISSION OF DATA ORIGINATING FROM ENTERPRISE INFORMATION SYSTEMS AS AUDIO PODCASTS

(75) Inventors: Stefan Kiefer, Speyer (DE); Amrish Singh, Pittsburgh, PA (US)

(73) Assignee: SAP AG, Walldorf (DE)

( * ) Notice: Subject to any disclaimer, the term of this patent is extended or adjusted under 35 U.S.C. 154(b) by 779 days.

(21) Appl. No.: 12/335,600

(22) Filed: Dec. 16, 2008

(65) Prior Publication Data

US 2010/0153113 A1  Jun. 17, 2010

(51) Int. Cl.
- G06F 7/00 (2006.01)
- G06F 17/30 (2006.01)
- G06F 17/20 (2006.01)
- G10L 13/00 (2006.01)

(52) U.S. Cl. ........ 707/756; 707/755; 707/791; 707/795; 707/802; 707/803; 704/258; 715/234

(58) Field of Classification Search ........... 707/999.003, 707/694, 999.104, 755, 756, 791, 795, 802, 707/803; 715/513, 234; 704/258
See application file for complete search history.

(56) References Cited

U.S. PATENT DOCUMENTS

| | | | |
|---|---|---|---|
| 6,745,161 B1 * | 6/2004 | Arnold et al. | 704/7 |
| 6,910,003 B1 * | 6/2005 | Arnold et al. | 704/4 |
| 7,043,488 B1 * | 5/2006 | Baer et al. | 1/1 |
| 7,051,019 B1 * | 5/2006 | Land et al. | 1/1 |
| 7,529,685 B2 * | 5/2009 | Davies et al. | 705/3 |
| 7,562,307 B2 * | 7/2009 | Betts et al. | 715/762 |
| 7,730,063 B2 * | 6/2010 | Eder | 707/736 |
| 7,996,373 B1 * | 8/2011 | Zoppas et al. | 707/694 |
| 2004/0145652 A1 * | 7/2004 | Yamauchi et al. | 348/14.02 |
| 2004/0205551 A1 * | 10/2004 | Santos | 715/513 |
| 2006/0004768 A1 * | 1/2006 | Betts et al. | 707/10 |
| 2006/0136194 A1 * | 6/2006 | Armstrong et al. | 704/4 |
| 2008/0040328 A1 * | 2/2008 | Verosub | 707/3 |
| 2008/0208589 A1 * | 8/2008 | Cross et al. | 704/275 |
| 2008/0250157 A1 * | 10/2008 | Ohata | 709/236 |
| 2009/0254572 A1 * | 10/2009 | Redlich et al. | 707/10 |

* cited by examiner

Primary Examiner — Mohammad Ali
Assistant Examiner — Bao Tran

(57) ABSTRACT

A background process retrieves enterprise data and syndicates podcasts created from the enterprise data to subscribed devices such as portable media player, mobile devices, and personal computers. A data to text converter converts the retrieved enterprise data to text and a text to audio converter converts the text from the data to text converter to an audio file. A multimedia file store is used to store the audio file.

8 Claims, 6 Drawing Sheets

| SYNC | DISCONNECT | PLAY |

| SUBSCRIBE | TITLE | DURATION | DESCRIPTION | SOURCE | LAST CHANGED |
|---|---|---|---|---|---|
| ☑ | Daily Sales Tracking | 02:20 | A report on the daily tracking of sales | Sales | 12.05.2008 |
| ☑ | ART Customer report | 10:34 | Detailed briefing on ART | Sales | 12.07.2008 |
| ☑ | Weekly Sales Activity | 05:30 | Weekly sales activities | Sales | 11.03.2008 |
| ☑ | Monthly Orders | 12:34 | Detailed description of monthly orders | Sales | 12.01.2008 |
| ☑ | Purchasing KPIs | 09:20 | Description of KPIs per month | Purchasing | 11.07.2008 |

FIG. 5

AUTOMATIC CREATION AND TRANSMISSION OF DATA ORIGINATING FROM ENTERPRISE INFORMATION SYSTEMS AS AUDIO PODCASTS

FIELD OF THE INVENTION

The invention relates generally to enterprise computing, and, more specifically, to converting enterprise data to audio podcasts.

BACKGROUND OF THE INVENTION

Enterprise software systems have traditionally been built with user interfaces that are accessible from personal computers or mobile workstations. For instance, an ERP system traditionally comes with a desktop-based Graphical User Interface (GUI). Alternatively, there are hosted solutions that require a web browser to access the enterprise data. The use of an enterprise system usually requires a direct connection to the system. That is why, use of these enterprise systems is, at present, limited to users with an access to a desktop or a mobile workstation.

This restriction poses three major problems for information workers. First, information workers are often mobile and demand to have access to their enterprise data without requiring them to use a computer. Second, for users with a laptop, Wireless Fidelity (WiFi) hotspots or other forms of network connectivity are often hard to find, expensive, and require users to carry additional forms of authentication to get access to their local company networks. Third, some information workers spend a majority of their time traveling, either between business appointments or to and from customer sites. This time would be utilized more productively if information workers had access to their enterprise data and use the time to further prepare for a business meeting.

Enterprise companies provide mobile solutions as additional means of accessing their enterprise information systems. These solutions usually run on PDAs, Tablet PCs, or smart phones, and allow information workers to access company enterprise systems via these devices.

Most of these solutions are proprietary and are limited to the hardware platform hosting these solutions. Furthermore, these solutions are only useful when the user is actively interacting with the mobile device. In some cases, it is not possible for mobile users to interact with the mobile device as they may be actively involved in other activities at the same time (such as driving a car). With increasing costs of network connectivity, it is also expensive for users to pay for accessing their enterprise system when mobile.

SUMMARY OF THE INVENTION

A system and method to convert structured data from an enterprise software system to an audio podcast are described. The system includes a background process to manage the conversion and send the created audio podcast to a mobile device; a data to text converter to convert the structured data to a text file; and a text to audio converter to convert the text file to an audio file. The audio file is stored to file storage and sent to a subscribed device. The device may be a mobile device or a personal computer.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 5 is a block diagram of an exemplary screen for a mobile device podcast manager in accordance with an embodiment of the invention.

DETAILED DESCRIPTION

Figure 1:
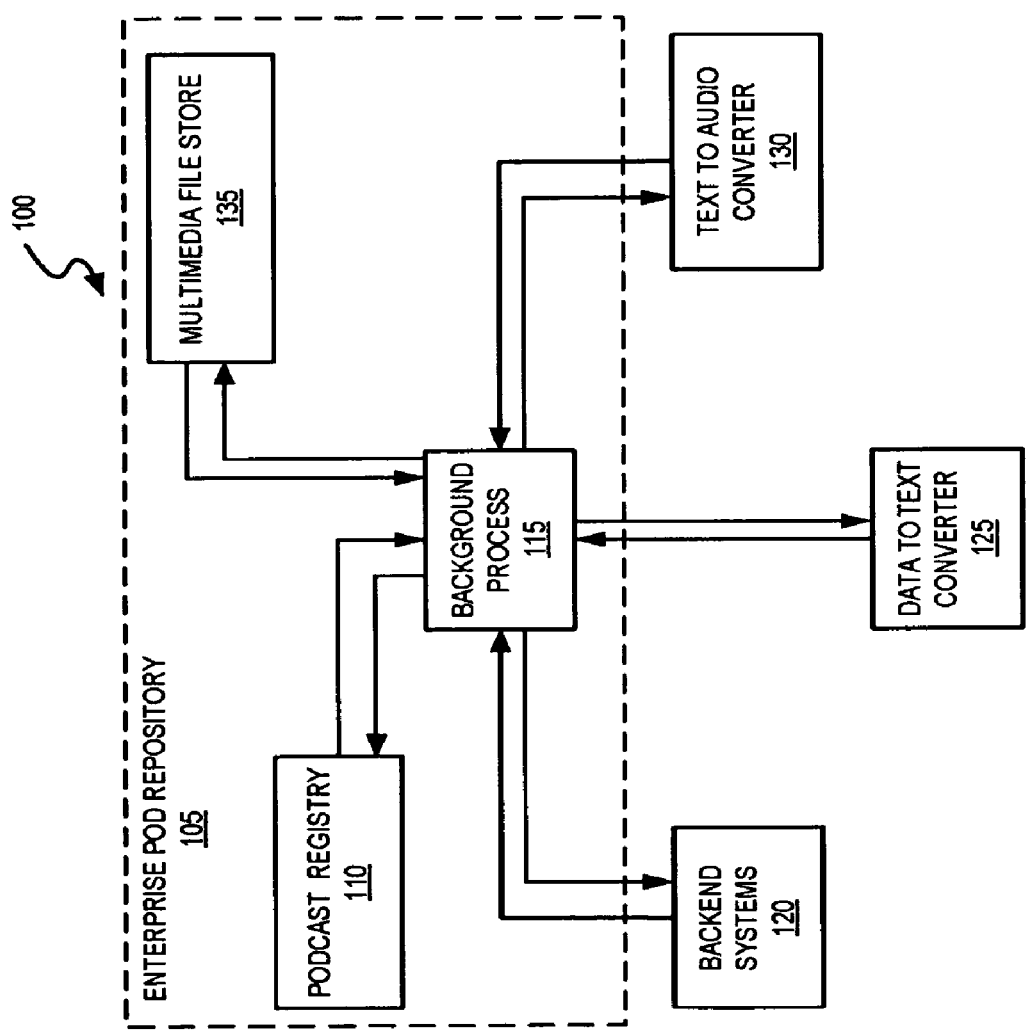
FIG. 1 is a block diagram of a system of an embodiment of the invention for converting structured data to audio podcasts.

A system and method for the automatic creation and transmission of data and information originating from enterprise information systems (hereinafter also referred to as "backend systems"), such as Enterprise Resource Planning (ERP), Customer Relationship Management (CRM), Supplier Relationship Management (SRM), and any other type of backed system, as audio podcasts for playback on portable media players, mobile devices, or personal computers are described.

A podcast is a collection of digital media files which is distributed over the Internet, often using syndication feeds (in Really Simple Syndication, hereinafter "RSS", or other such formats), for playback on portable media players and personal computers. The term "podcast" may refer either to the content itself or to the method by which it is syndicated; the method distributing podcasts is also referred to as podcasting.

The process of creating a podcast from information originating in an enterprise software system involves the extraction of structured data from an enterprise system, the conversion of structured data to human-readable text, the subsequent conversion of this text to audio, and the transmission of this audio using syndicated feeds. Data from backend systems is specific to the type of system. For example, a CRM system may maintain data about customers, sales, and marketing campaigns. An ERP system may maintain data about human resources, finances, and accounting. Backend systems may maintain data in a format specific to the system. In response to a request for data, backend systems return the requested data in XML format. Each backend system may use an XML format specific to the system. To convert the XML from each system to text, a conversion to a unified XML format is performed first.

Using an embodiment of the invention, information workers on the go may subscribe to receive events or information services originating from diverse enterprise information systems as audio podcasts for playback on portable media players, mobile devices, or personal computers. For example, a sales representative driving to a customer site expects to sign a new sales contract with a potential customer. The information worker could use the time spent traveling to gather background information on the customer (such as, previous sales agreements, orders, customer issues, etc.), so that when she reaches the customer, she may be prepared for the meeting. The information worker subscribes to a podcast and receives data from the enterprise software system of the company in an audio format. The information worker may then listen to the audio podcast while driving to the customer's site, thus saving time and effort. As an additional benefit, relevant information is transformed automatically from, for example, figures in backend systems to complete and comprehensive text. Thus, raw data in the form of figures is transformed to interesting materials of relevance to the information worker (that is, in the example above, the sales representative). Once the process is set up, the system of the embodiment of the invention operates automatically without human interaction to deliver up to date valuable information.

FIG. 1 is a block diagram for a system 100 of an embodiment of the invention for converting structured data from backend systems to audio podcasts. Referring to FIG. 1, the Enterprise Podcasting (hereinafter also referred to "EPOD") repository 105 manages the process of creating, storing, and syndicating podcasts (hereinafter also referred to as "EPOD" or "EPODs", that is, podcasts created by the EPOD repository) from backend systems 120. The podcast registry 110 is a database that may maintain user subscription data to available podcasts and a list of all available podcasts. The enterprise POD repository 105 may store the following types of configuration data: a list of EPODs, language-dependent template information (such as text templates for EPODs), system landscape information (such as details on backend systems to be used), enterprise data source information (such as the functions, database tables, and enterprise services to be called to obtain structured data), XSL information (such as XSL transformation rules to transform native XML used by a backend system to a universal system-independent XML, hereinafter also referred to as "EPOD XML"), and customizing tables (such as file store location, addresses of any external text services to use). The background process 115 manages the EPOD creation and syndication using the information from the podcast registry 110 and configuration data from the enterprise POD repository 105. The background process 115 may also store created podcasts to the multimedia file store 135. To create a podcast, the background process 115 retrieves data from backend systems 120 based on the information from the podcast registry 110. The background process 115 receives the data from the backend systems 120 in EPOD XML format. The background process 115 retrieves a text template form the podcast registry 110 and supplies the received EPOD XML and the text template to the data to text converter 125. The data to text converter 125 parses the text template and exchanges placeholders in the text template with data from the EPOD XML. The data to text converter 125 replaces placeholders in the text template with data according to mapping rules that specify how XML tags in the EPOD XML map to placeholders in the text template. After all placeholders are replaced with data, the data to text converter 125 returns the created text file to the background process 115. The background process 115 obtains the address of an external service from the podcast registry 110 to use as a text to audio converter and sends the text file to the text to audio converter 130. The text to audio converter 130 creates an audio file in a common format (for example, MPEG Layer 3 ("MP3")) and returns the audio file to the background process 115. The background process 115 stores the audio file to the multimedia file store 135. The background process 115 also syndicates the audio file to subscribed podcasts.

The system 100 is independent of the enterprise information systems and is also independent of the mobile platform because a standardized audio format is used. Additionally, since information is available as audio podcasts, mobile workers can perform other activities, such as driving and playing sports, while listening to enterprise podcasts. The subscription mechanism of podcasting enables information workers to remain up-to-date with activities in their enterprise without requiring them to actively reach out and search for information, thus saving effort. Because the system 100 provides updates on a subscription basis, updates are received by subscribed users without the need of any additional effort on the part of the subscribed users. The text to audio conversion (that is, information in the text file is being "read" to the subscriber), enables mobile users to perform business and other activities in parallel, thereby saving time. Further, the system 100 may create relevant podcasts on demand. For example, the system 100 may estimate which customers are to be visited for a week ahead and create EPODs for such customers; the EPODs may contain data for each customer.

Figure 2:
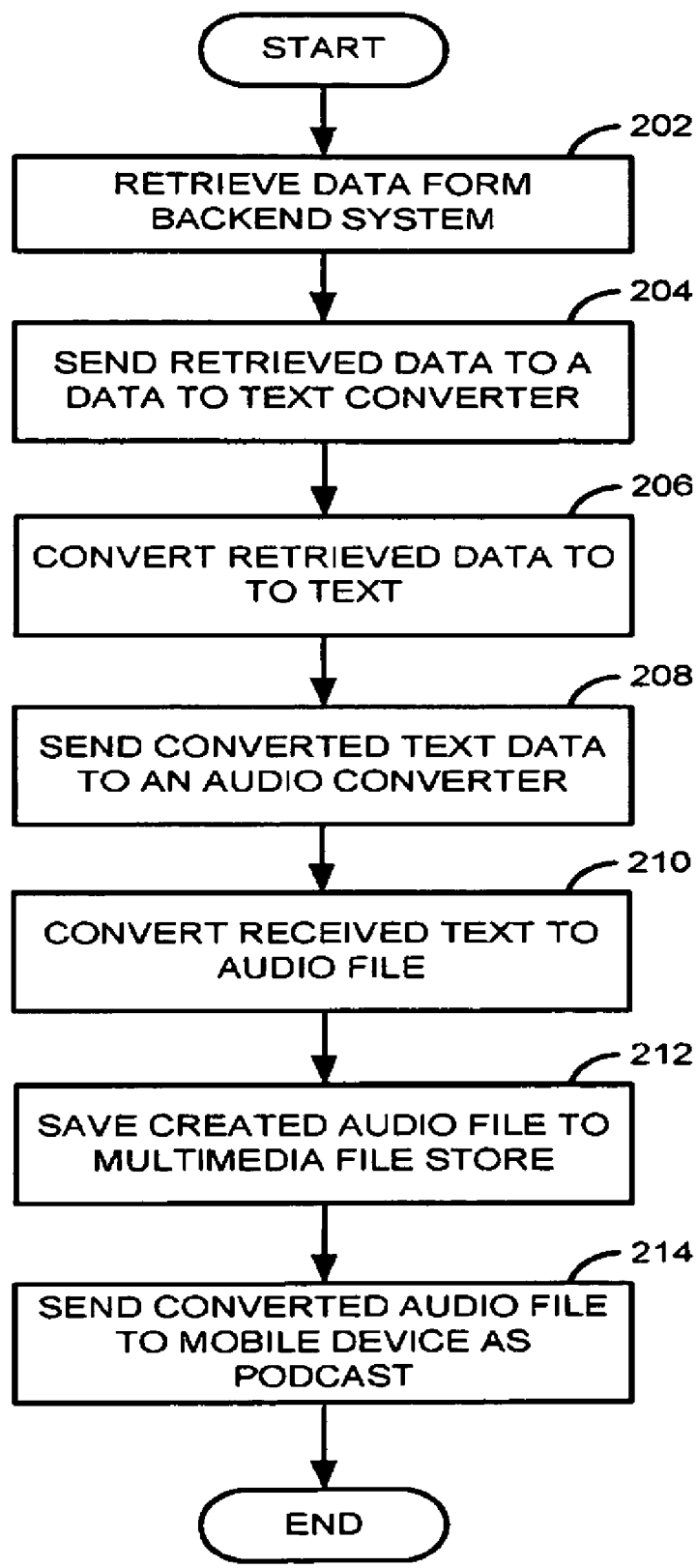
FIG. 2 is a flow diagram of an embodiment of the invention for converting structured data to audio podcasts.

FIG. 2 is a flow diagram of an embodiment of the invention for converting structured data to audio podcasts. Referring to FIG. 2, at process block 202, data from a backend system is retrieved. At process block 204, the retrieved data is sent to a data to text converter. At process block 206, the retrieved data is converted to text. After the conversion, a text file with cohesive text is created. At process block 208, the converted text data (that is, the text file) is sent to a text to audio converter. At process block 210, the received text file is converted to an audio file. At process block 212, the created audio file is saved. At process block 214, the audio file is sent as a podcast to subscribed mobile devices.

In an embodiment of the invention, the process as described in FIG. 2 is performed by components as described in FIG. 1. Referring to FIG. 1 and FIG. 2, at process block 202, the background process 115 retrieves data from a backend system. At process block 204, the background process 115 sends the retrieved data to the data to text converter 125. At process block 206, the data to text converter 125 converts the retrieved data to text. After the conversion, a text file with cohesive text is created. At process block 208, the background process 115 sends the converted text data (that is, the text file) to the text to audio converter. In another embodiment of the invention, the background process 115 may send a file in a different format to the text to audio converter. The enterprise POD repository 105 may maintain a list of addresses of external services that can be used for text to audio conversion. In one embodiment, each system uses a particular service. At process block 210, the text to audio converter 130 converts the received text file to an audio file. At process block 212, the background process 115 saves the created audio to the multimedia file storage 135. At process block 214, the background process 115 sends the audio file as a podcast to subscribed mobile devices.

Figure 3:
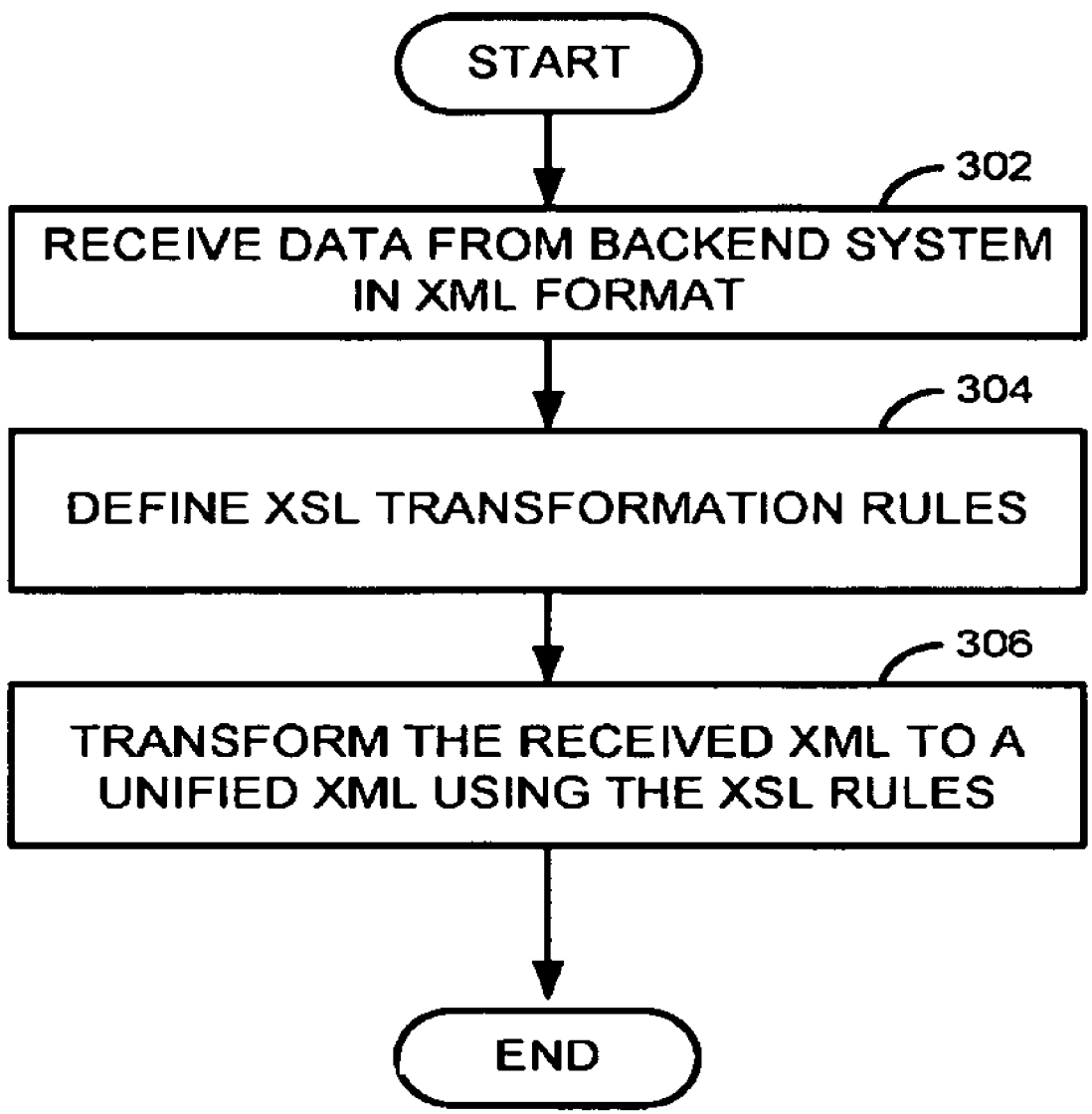
FIG. 3 is a flow diagram of an embodiment of the invention for retrieving data from a backend system.

FIG. 3 is a flow diagram of an embodiment of the invention for retrieving data from a backend system. Backend systems may maintain data in proprietary or commonly-supported formats. Backend systems usually provide interfaces to retrieve data in XML, that is, the data format used in the system is converted to XML and supplied to the requester in XML. In one embodiment of the invention, if data in a backend system is maintained in a proprietary format, the backend system provides an interface to retrieve data in the proprietary format and convert the proprietary format to an XML format.

Referring to FIG. 3, at process block 302, data from a backend system is received in XML format. At process block 304, XSL transformation rules are defined. There is a need to define XSL transformation rules because the XML supplied by various types of backend systems by various vendors may differ. To be able to process data from any type of backend system, an embodiment of the invention defines a set of XSL transformation rules that specify how an XML supplied by a backend system may be transformed to the unified EPOD XML. At process block 306, the received XML is transformed to the EPOD XML using the XSL transformation rules. As XML varies across platforms of backend systems, the embodiment of the invention defines a set of XSL transformation rules for each backend system used to obtain data for podcasts. An XSL transformation rule describes how XML tags may be reordered in a different format. That is, XSL transformation rules specify how disparate XML tags received as input from different backend systems may be reordered according to the format of EPOD XML.

In one embodiment of the invention, the process as described in FIG. 3 is performed by components as described in FIG. 1. Referring to FIG. 1 and FIG. 3, at process block 302, the background process receives data from a backend system in an XML format specific to the backend system. At process block 304, the background process defines XSL transformation rules. The background process defines XSL transformation rules because the XML supplied by various types of backend systems by various vendors may differ. To be able to process data from any type of backend system, the background process 115 defines a set of XSL transformation rules that specify how an XML supplied by a backend system may be transformed to the unified EPOD XML. At process block 306, the background process 115 transforms the received XML to the EPOD XML using the XSL transformation rules. As XML varies across platforms of backend systems, the background process 115 in the embodiment of the invention defines a set of XSL transformation rules for each backend system used to obtain data for podcasts.

Figure 3A:
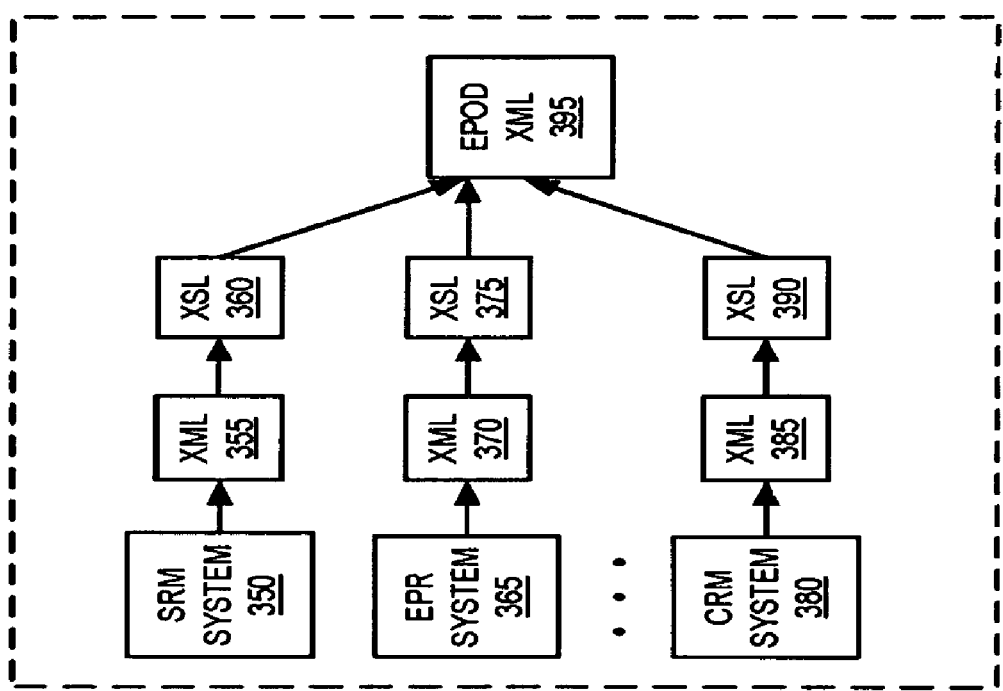
FIG. 3A is a block diagram of an exemplary system of an embodiment of the invention for retrieving data from backend systems.

FIG. 3A is a block diagram of an exemplary system of an embodiment of the invention for retrieving data from backend systems. Referring to FIG. 1 and FIG. 3A, a number of backend systems are used by the background process 115 to obtain enterprise data. These are SRM system 350, ERP system 365, and CRM system 380. Each of these systems provides data in an XML format specific to the system. The SRM system 350 provides data in XML 355. The ERP system provides data in XML 370. The CRM system 380 provides data in XML 385. The background process 115 defines a set of XSL transformation rules for each of the systems, such as XSL 360, XSL 375, and XSL 390, respectively. Using the respective XSL transformation rules, the background process 115 transforms each of the XML formats used to the unified EPOD XML used by the system of FIG. 1. It should be appreciated that systems of embodiments of the invention may retrieve data from any or all of a number of backend systems. As such, FIG. 3A is an exemplary embodiment and does not limit the data retrieval capabilities of embodiments of the invention to the systems mentioned therein.

XSL transformation rules may be stored in the enterprise POD repository 105 for later reference. Using XSL transformation rules enables the easy extensibility of the system of the embodiment of the invention. New backend systems can be used by the background process 115 with little effort involved. The only requirement for the usage of a new system to obtain data is the definition of a new set of rules.

Figure 4:
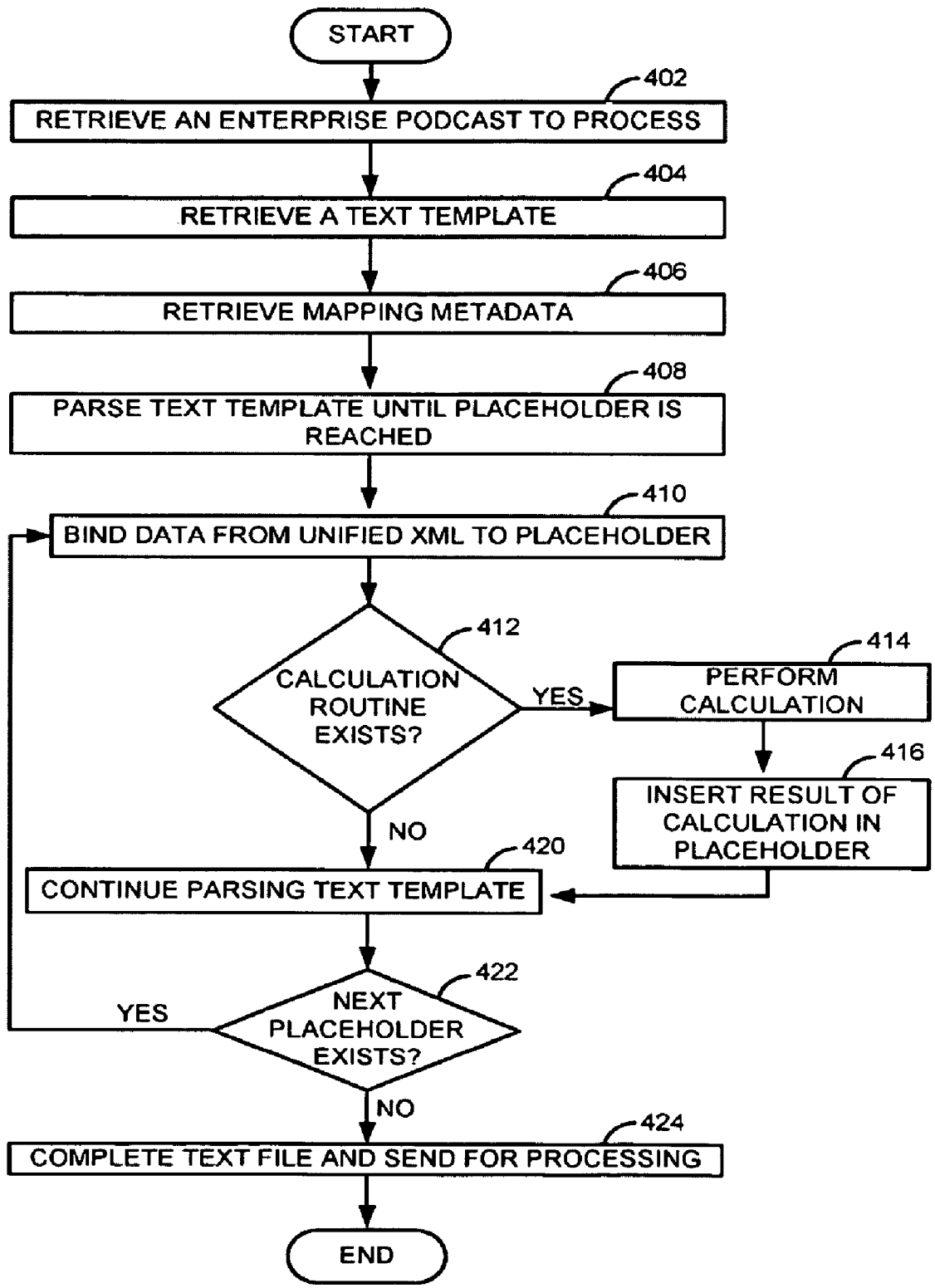
FIG. 4 is a flow diagram of an embodiment of the invention for converting structured data to text.

FIG. 4 is a flow diagram of an embodiment of the invention for converting structured data to text. Backend systems maintain data in structured form, such as, but not limited to, database tables. For data to be meaningful to a subscriber, the structured data from the backend system is converted to cohesive text. In one embodiment of the invention, data is converted to text using a text template. The text template has placeholders for data. Referring to FIG. 4, at process block 402, an EPOD to process is retrieved. At process block 404, a text template is retrieved based on the retrieved EPOD. In one embodiment, a system of an embodiment of the invention may maintain a number of text templates in one or more languages to be able to send podcasts to subscribed users depending on the users' geographic location and language preferences. The following is an exemplary listing of a text template with placeholders:

---

The top five sales orders this week have a total value of <TOTAL_VALUE_SO> <TOTAL_VALUE_CURRENCY_SPEEKABLE>. Number one is <TOP_CUSTOMER_1> with <REVENUE_CUSTOMER_ONE> on rank number two is <TOP_CUSTOMER_2> with <REVENURE_CUSTOMER_2>, number three is <TOP_CUSTOMER_3> with <REVENUE_CUSTOMER_3>, <CUSTOMER_FOUR> with <REVENUE_CUSTOMER_4> and <CUSTOMER_5>...

---

At process block 406, mapping metadata is retrieved. Mapping metadata specifies how placeholders are mapped to EPOD XML tags. At process block 408, the text template is parsed until a placeholder is reached. At process block 410, data form the EPOD XML is bound to the placeholder according to the mapping rules. At process block 412, a check for a calculation routine is performed. This check is necessary because placeholders may accept data from the backend system directly or may accept the results of calculation routines, algorithms, and data conversions. For example, in the listing above, "<TOTAL_VALUE_SO>" is a placeholder for the total value of the sales orders for a given week. This means that the total value is first computed form the retrieved structured data and is then inserted in the placeholder. Alternatively, "<CUSTOMER_5>" is simply a string identifying a customer which is replaced without the need of additional computation. If a calculation routine is necessary, at process block 414, the calculation is performed. At process block 416, the result from the calculation is inserted in the placeholder. After the result is inserted, or if at process block 412 there is no need of additional calculations, at process block 420, the parsing of the text template continues until a next placeholder is found via the check in process block 422. The text template is parsed until all placeholders are replaced by the respective data as required in the mapping rules. If no further placeholders exist at the check at process block 422, the created text file is completed and sent for further processing.

In one embodiment of the invention, the process as described in FIG. 4 is performed by components as described in FIG. 1. Referring to FIG. 1 and FIG. 4, at process block 402, the background process 115 retrieves an EPOD to process from the podcast registry 110. At process block 404, based on the retrieved EPOD, the background process 115 retrieves a text template to process from the enterprise POD repository 105.

At process block 406, the background process 115 retrieves mapping metadata from the enterprise POD repository 105. Mapping metadata specifies how placeholders are mapped to EPOD XML tags. At process block 408, the data to text converter 125 parses the text template until a placeholder is reached. At process block 410, the data to text converter 125 binds data form the EPOD XML to the placeholder according to the mapping rules. At process block 412, the data to text converter 125 checks if a calculation routine exists for the placeholder. This check is necessary because placeholders may accept data from the backend system directly or may accept the results of calculation routines, algorithms, and data conversions. For example, in the listing above, "<TOTAL_VALUE_SO>" is a placeholder for the total value of the sales orders for a given week. This means that the total value is first computed from the retrieved structured data and is then inserted in the placeholder. Alternatively, "<CUS- TOMER_5>" is simply a string identifying a customer which is replaced without the need of additional computation. If a calculation routine is necessary, at process block 414, the data to text converter 125 performs the calculation. At process block 416, the data to text converter 125 inserts the result from the calculation in the placeholder. After the result is inserted or if at process block 412 there is no need of additional calculations, at process block 420, the data to text converter 125 continues to parse the text template until a next placeholder is found via the check in process block 422. The text template is parsed until the data to text converter 125 replaces all placeholders by the respective data as required in the mapping rules. If no further placeholders exist at the check at process block 422, the created text file is completed and sent to the background process 115 for further processing. The result of the process described in FIG. 4 is meaningful and cohesive text. The exemplary text template above may produce the following result:

The top five sales orders of this week have a total value of thirteen million dollars. Number one is customerA with five point one million dollars on rank number two is customerB with three million dollars, number three is cutomerC with two million dollars, customerD with one point nine million dollars and customerE with one point eight million dollars. The total revenue is thirty-two million dollars.

Following the process as described in FIG. 2 and performed by the components of FIG. 1, such a text file as the exemplary listing above may be sent by the background process 115 to an external service such as the text to audio converter 130 to convert the text to a common audio format. In the audio file, the cohesive meaningful text is "read" to the user. For example, a sales representative subscribes to sales reports from her employer. The background process 115 will continuously update podcasts and send to the subscriber (i.e. the sales representative) updated sales reports as the data becomes available in the enterprise system, for instance a CRM system. In one embodiment, the background process may be scheduled to deliver updated content at predefined time intervals. To syndicate the newly available content (that is, podcast or EPOD), the background process 115 converts the audio file to a "feed" such as a RSS feed. The following is an exemplary feed from an EPOD of an embodiment of the system:

```
<?xml version="1.0"?>
<rss version="2.0">
    <channel>
        <title>Enterprise POD</title>
        <link>http://epod.sap.com/</link>
        <language>en-us</language>
        <pubDate>Tue, 10 Dec 2007 04:00:00 GMT</pubDate>
        <lastBuildDate>Tue, 3 Dec 2007 09:41:01 GMT</lastBuildDate>
        <generator>EnterprisePOD</generator>
    <item>
        <title>Daily Sales Tracking</title>
        <link>http://epod.sap.com/sales/daily_2007_12_02.mp3</link>
        <description>A report on the daily tracking of sales, leads and opportunities</description>
        <pubDate>12 Dec 2007 09:41:01 GMT</pubDate>
        <guid>http://epod.sap.com/sales/daily_2007_12_02.mp3</guid>
    </item>
    <item>
        <title>ART Customer Report</title>
        <link>http://epod.sap.com/misc/art_inc.mp3</link>
        <description>Detailed Briefing on ART Inc. including previous purchases, sales and other</description>
        <pubDate>12 Dec 2007 11:11:01 GMT</pubDate>
        <guid>http://epod.sap.com/misc/art_inc.mp3</guid>
    </item>
    <item>
        <title>Monthly Purchasing KPIs</title>
        <link>http://epod.sap.com/purchasing/monthly_2007_11_29.mp3</link>
        <description>Description of monthly purchasing activities and fulfillment of key performance indicators</description>
        <pubDate>29 Nov 2007 23:11:01 GMT</pubDate>
        <guid>http://epod.sap.com/purchasing/monthly_2007_11_29.mp3</guid>
    </item>
    </channel>
</rss>
```

Using the information in the feed, the mobile device of the sales representative in the example retrieves the required content and the sales representative can listen to the sales report while also performing other activities thus saving time and effort.

In one embodiment of the invention, an EPOD may be used to provide customer fact sheets having detailed briefing information about one particular customer, latest purchases, customer issues, trend of purchases, and so on. Such an EPOD may be listened to by subscribed users while traveling to customer visits to prepare for business meetings.

In one embodiment of the invention, an EPOD may be used to provide sales reports, such as, for example, "top five sales of the week". The sales report may contain customers, value of deals, and the sales representative who made the deal.

In another embodiment of the invention, an EPOD may be used to provide a revenue forecast for a given period of time, such a month, year or quarter. Such an EPOD may be listened to while driving to work.

In another embodiment of the invention, an EPOD may be used to retrieve calendar events from an enterprise system and provide a task list for an employee for a given period such as a week ahead. Such an EPOD may be listened to by a subscribed user on Monday morning while driving to work to prepare for the week ahead.

In an embodiment of the invention, an EPOD may be used to provide alerts. For example, in a procurement department, an EPOD may be created to retrieve and analyze procurement data from an enterprise system and send a podcast to all employees of the department with an alert for the top ten products where prices have increased since the last purchase by more than ten percent. Such information may be important to the department for cost saving measures and future purchasing strategy. Such an EPOD may be listened to by the subscribed users while traveling.

In an embodiment of the invention, an EPOD may be used to provide financial key performance indicators (KPIs) to members of a finance and controlling unit. Such an EPOD may provide the top KPIs for a quarter including current data, forecast data and trends for a given period of time. Such an EPOD may be listened to by the subscribed users while traveling.

FIG. 5 is a block diagram of an exemplary screen for a mobile device podcast manager in accordance with an embodiment of the invention. Referring to FIG. 5, the screen 500 displays the EPODs available for subscription. The screen 500 also displays a sync button 505 and a disconnect button 510. The sync button 505 synchronizes the subscribed feeds with the latest available information. The disconnect button 510 disconnects the podcast manager from the podcast service. Using the checkboxes in the subscribe column of the screen, a user of the screen 500 elects to subscribe to feeds of interest. The screen 500 provides a title, description, duration, source, and last changed information for each of the listed feeds. Using the play button 515, a user of the screen 500 may elect to play a feed.

Elements of embodiments of the invention described herein may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system, comprising:
one or more processors;
one or more non-transitory memory devices, the memory devices having stored thereon instructions related to:
a background process module to retrieve enterprise data and syndicate podcasts created from the enterprise data to subscribed devices, the background process module further operable to:
receive the enterprise data from a backend system in eXtensible Markup Language (XML) format;
define eXtensible Stylesheet Language (XSL) transformation rules for the transformation of the received XML data in a unified XML format; and
transform the received XML data into the unified XML format using the defined XSL transformation rules;
a data to text converter to convert the retrieved enterprise data to text operable to:
retrieve an enterprise podcast to process;
retrieve a text template, wherein the text template includes text and one or more placeholders for data;
retrieve mapping rules, wherein the mapping rules define rules for the mapping of XML tags to placeholders; and
replace the one or more placeholders with data from corresponding XML tags based on the retrieved mapping rules, wherein the data to text converter is further operable to:
parse the text template until a placeholder is reached;
bind data from an XML tag to the placeholder according to the mapping rules;
determine the mapping rules define a calculation routine for the placeholder;
perform the calculation routine; and
insert the result in the placeholder;
a text to audio converter to convert the text from the data to text converter to an audio file; and
a multimedia file store to store the audio file.

2. The system of claim 1, further comprising a podcast registry to maintain information about backend systems and podcasts.

3. A method, comprising:
retrieving data from a backend system, comprising:
receiving the data from the backend system in eXtensible Markup Language (XML) format;
defining eXtensible Stylesheet Language (XSL) transformation rules for the transformation of the received XML data in a unified XML format; and
transforming the received XML data into the unified XML format using the defined XSL transformation rules;
converting the retrieved data to text, comprising:
retrieving an enterprise podcast to process;
retrieving a text template, wherein the text template includes text and one or more placeholders for data;
retrieving mapping rules, wherein the mapping rules define rules for the mapping of XML tags to placeholders; and
replacing the one or more placeholders with data from corresponding XML tags based on the retrieved mapping rules, comprising:
parsing the text template until a placeholder is reached;
binding data from an XML tag to the placeholder according to the mapping rules;
determining the mapping rules define a calculation routine for the placeholder;
performing the calculation routine; and
inserting the result in the placeholder;

converting the created text to an audio file;
saving the audio file to a storage; and
sending the audio file to a mobile device as a podcast.

4. The method of claim 3, further comprising parsing the text template until all placeholders are bound to data from the XML data.

5. The method of claim 3, wherein converting the created text to an audio file comprises retrieving a service to convert the created text to an audio file.

6. A non-transitory machine readable medium having instructions therein that when executed by the machine, cause the machine to:
   retrieve data from a backend system, wherein the instructions to retrieve data from a backend system further comprise instructions, which when executed by the machine, cause the machine to:
      receive data from the backend system in eXtensible Markup Language (XML) format;
      define eXtensible Stylesheet Language (XSL) transformation rules for the transformation of the received XML data in a unified XML format; and
      transform the received XML data into the unified XML format using the defined XSL transformation rules;
   convert the retrieved data to text, wherein the instructions to convert the retrieved data to text further comprise instructions, which when executed by the machine, cause the machine to:
      retrieve an enterprise podcast to process;
      retrieve a text template, wherein the text template includes text and one or more placeholders for data;
      retrieve mapping rules, wherein the mapping rules define rules for the mapping of XML tags to placeholders; and
      replace the one or more placeholders with data from corresponding XML tags based on the retrieved mapping rules, wherein the instructions to replace the one or more placeholders with data from corresponding XML tags based on the retrieved mapping rules further comprise instructions, which when executed by the machine, cause the machine to:
         parse the text template until a placeholder is reached;
         bind data from an XML tag to the placeholder according to the mapping rules;
         determine the mapping rules define a calculation routine for the placeholder;
         perform the calculation routine; and
         insert the result in the placeholder;
   convert the created text to an audio file;
   save the audio file to a storage; and
   send the audio file to a mobile device as a podcast.

7. The machine-readable medium of claim 6, further comprising instructions that cause the machine to parse the text template until all placeholders are bound to data from the XML data.

8. The machine-readable medium of claim 6, wherein the instructions causing the machine to convert the created text to an audio file, cause the machine to retrieve a service to convert the created text to an audio file.

* * * * *